Figure 3:
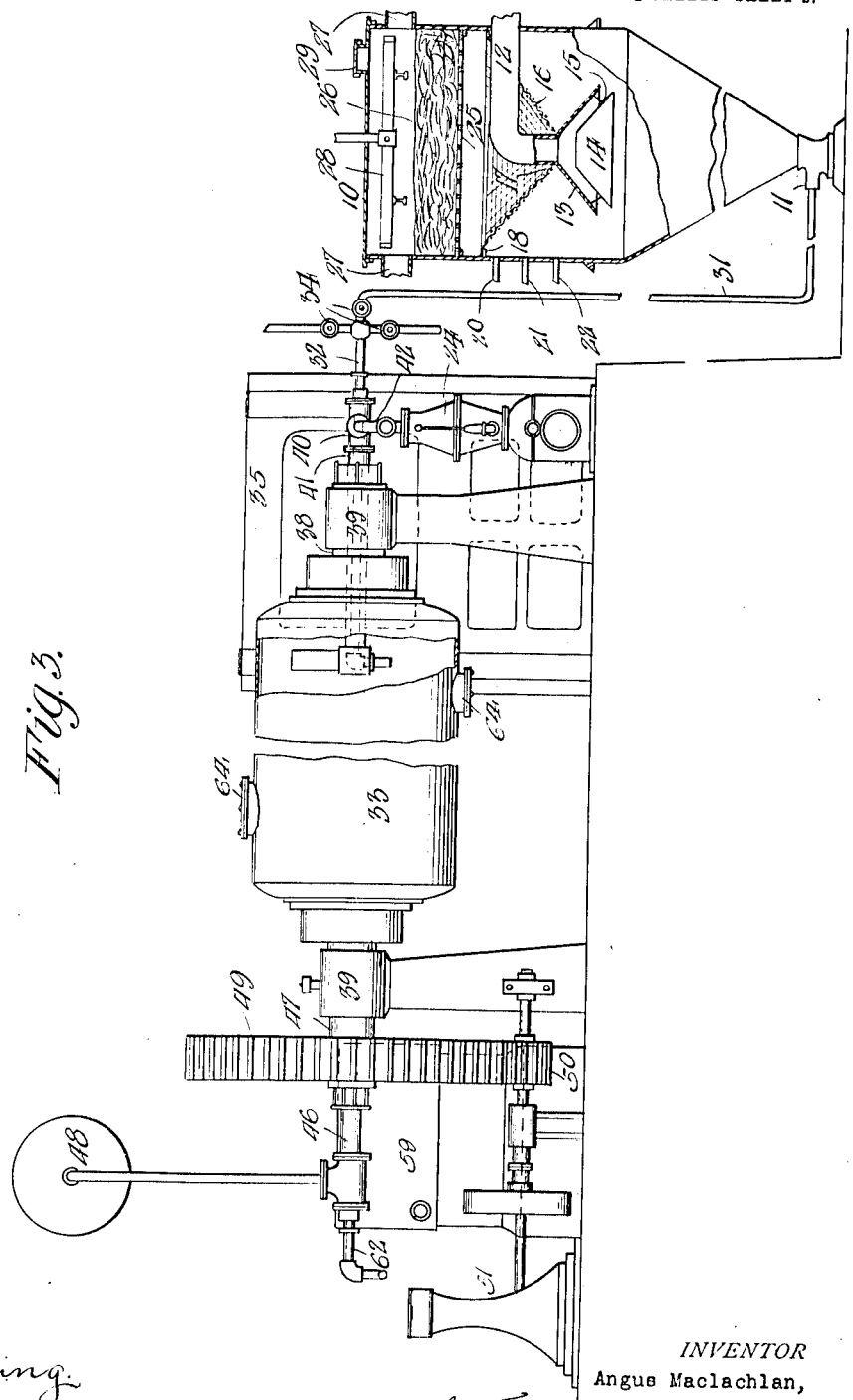

A. MACLACHLAN.
APPARATUS FOR REDUCING SEWAGE AND THE LIKE.
APPLICATION FILED NOV. 28, 1911.
1,035,797.
Patented Aug. 13, 1912.
2 SHEETS—SHEET 1.
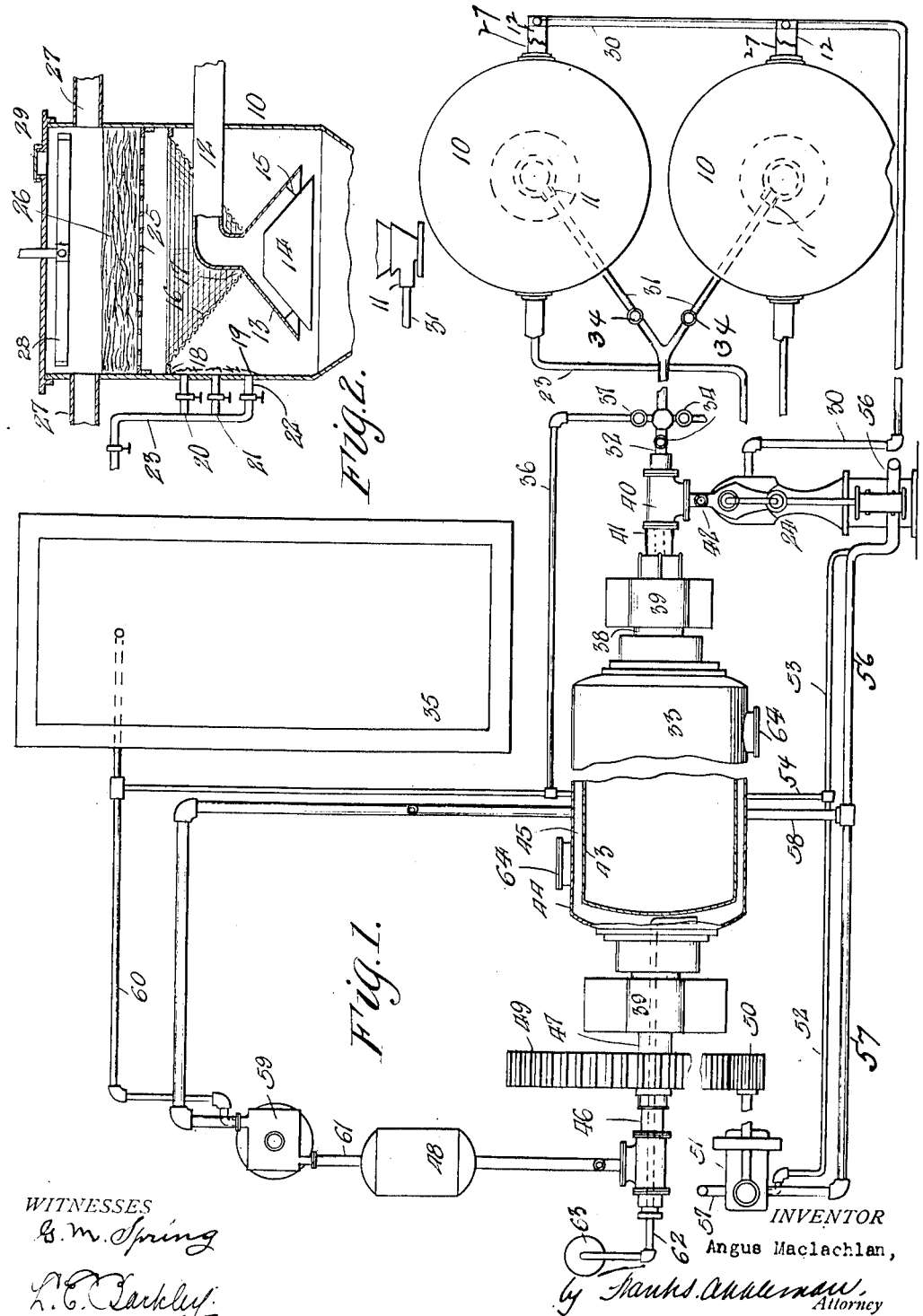
WITNESSES
INVENTOR
Angus Maclachlan,
Attorney A. MACLACHLAN.
APPARATUS FOR REDUCING SEWAGE AND THE LIKE.
APPLICATION FILED NOV. 28, 1911.

1,035,797.

Patented Aug. 13, 1912.
2 SHEETS—SHEET 2.

WITNESSES
G. M. Spring.
A. E. Barkley.

INVENTOR
Angus Maclachlan,
by Frank L. Anderson
Attorney

UNITED STATES PATENT OFFICE.

ANGUS MACLACHLAN, OF BROOKLYN, NEW YORK, ASSIGNOR TO HAMMOND IRON WORKS, OF WARREN, PENNSYLVANIA, A CORPORATION OF PENNSYLVANIA.

APPARATUS FOR REDUCING SEWAGE AND THE LIKE.

1,035,797.

Specification of Letters Patent.   Patented Aug. 13, 1912.

Application filed November 28, 1911.   Serial No. 662,883.

*To all whom it may concern:*

Be it known that I, ANGUS MACLACHLAN, a citizen of the United States of America, and resident of Brooklyn, in the county of Kings and State of New York, have invented certain new and useful Improvements in Apparatus for Reducing Sewage and the Like, of which the following is a specification.

This invention relates to apparatus designed for use in treating and reclaiming night soils, sludge, and sediment from sewage and the invention may be regarded as an improvement in sewage disposal plants.

An object of this invention is to produce an apparatus having means for separating the solids from liquids of sewage, means being provided for odorlessly treating the solids and for odorlessly disposing of the liquids in their separated state, novel means being also provided for reducing the sediment or solid matter to a dry or powdered state in which condition it is useful as a fertilizer or as a fuel.

A further object of this invention is to provide an apparatus having a series of settling tanks in communication one with the other, and in the provision of novel means for transferring liquid from one of the tanks to another when the first mentioned tank is to be discharged, thereby providing for the reclamation of any solid matter in suspension which may be in the first mentioned receptacle, the treatment thus described insuring or practically insuring that all of the solid matter contained in the liquid shall be removed therefrom prior to the discharge of the liquid from the receptacle.

Furthermore, it is the object of this invention to provide each of said settling chambers with a discharge pipe for the liquid unaccompanied by solid matter and to the end that the said liquid may be freed of solid matter, a filter is provided in each of the said receptacles or tanks which filter has been found to clarify the water, in order that the water passing from the receptacle may be free from odor, and it may be discharged into an ordinary sewer connection without contaminating the air or other deleterious effect.

With the foregoing and other objects in view, the invention consists in the details of construction and in the arrangement and combination of parts to be hereinafter more fully set forth and claimed.

In describing the invention in detail, reference will be had to the accompanying drawings, forming part of this specification wherein like characters of reference denote corresponding parts in the several views, and in these drawings Figure 1 is a plan view of the apparatus for carrying out the invention; Fig. 2 is a vertical sectional view of one of the settling tanks and the parts associated therewith; Fig. 3 is a view in elevation of a drier, the means for operating the drier and the connection between the drier and one of the tanks.

In these drawings, 10, denotes the settling tanks which have tapered bottoms provided with a coupling 11 of any appropriate type through which the solid or semi-solid matter which has precipitated or settled in the said tank may be drawn from the tank for a purpose to be presently explained.

Each tank is provided with a feed pipe 12 preferably connected to a sewer or other source of supply, the said feed pipe having a liquid tight joint through the wall of the tank and extending therein to any desired extent, the said pipe being here shown as terminating at approximately the transverse center of the said tank. The inner end of the feed pipe discharges within the tank and is here shown as having a flared spout 13, which is suspended in proximity to a spreader or baffle 14, the said spreader or baffle being here shown as supported by the rods 15 supported by the spout, but these details may be variously modified in practice. The tank also contains above the discharge end of the feed pipe a conical screen 16, a portion of which is removed at 17 for the passage therethrough of the feed pipe. The screen has its edge supported by the rib 18 attached to the internal wall of the tank and the said screen is provided for the purpose of screening the materials which are fed into the tank when the liquid rises in said tank above the said screen, and it has been found in practice that leaves and other comparatively light objects and materials will be arrested by the screen as the water ascends therethrough, the said materials being held by the screen until they become water-logged and gravitate toward the bottom of the tank or until liquid is drawn therefrom. To guard against clogging the outlet pipes of the tank designed for the flow of liquid therethrough by floating matter, such as wood, the outlet pipes for the unfiltered liquid may be guarded by a screen 19 fastened in place in any appropriate way. The pipes heretofore mentioned for the discharge of liquid (other than that which is filtered from the tank) are indicated by the numerals 20, 21 and 22, each of which is provided with a valve of any appropriate type and each of which is connected to a header or pipe 23; the said pipe 23 leading to the vacuum pump 24 in order that the said water within the tank may be under the influence of the vacuum pump 24 and may be drawn from the tank thereby.

A grid or screen 25 is supported in the tank in any appropriate manner near the top thereof and is designed as a base or support for a filter bed 26, which filter bed may consist of any appropriate filtering agents which may be considered suitable for use on the particular material being treated. At points above the filtering bed, discharge pipes 27 are connected to the interior of the tank, in order that the filtered liquid may pass therethrough as it rises in the tank. The number of the discharge pipes is immaterial but more uniform circulation will be obtained by having a plurality thereof. Within the said tank, over the filtering bed, is a sprinkler or water supply pipe 28 which may be used for supplying clean water to the filtering bed for the purpose of cleaning the same, and the said tank may further be provided with a man-hole 29 at the top thereof to permit access to the interior of the tank for the purpose of effecting repairs or for cleaning the interior or removing obstructions or the like.

The supply pipes 12 of the tank have couplings to a pipe 30 which leads from the pump 24 and by the aid of the said pump, liquid which is drawn from the tank through the pipes 20, 21 and 22 may be forced through the pipe 30 to any one or more of the feed pipes of the companion tanks, thus returning unfiltered liquid from a tank that is to be discharged to a tank which is in course of operation. This provision prevents the escape of liquid which has not passed through the steps of the process necessary to render it harmless.

The coupling 11 of each tank is provided with a pipe 31 which is connected to a pipe 32, leading to the interior of a drier 33, each of the said pipes 31 being provided with a valve 34 for the purpose of interrupting communication between the tanks and the drier at the will of the operator. The pipe 31 is furthermore in communication with a steam supply such as a boiler 35 through the medium of a pipe 36 which is likewise provided with a valve 37. The pipe 32 extends through the trunnion 38 of the drier, the said trunnion being mounted in a journal bearing 39. The pipe 32 also extends through a coupling 40 and a pipe 41 which latter pipe extends into the drier and then rises therein and terminates at a point near the inner wall of the drier, the said coupling 40 having a connection 42 with the vacuum pump 24 so that by the operation of the said pump, a vacuum or partial vacuum may be created in the drier in order that the vacuum may act to draw material from the tanks 10. The drier 33 preferably comprises a cylinder 43 having a jacket 44 with an intervening space 45, which intervening space may be termed a steam chamber as it is provided for the purpose of receiving a heating agent through the medium of a pipe 46 which extends through the trunnion or journal 47 of said cylinder, the said pipe 46 being connected to a source of steam supply, here shown as a steam receiver 48. The trunnion or bearing 47 of the cylinder has a gear wheel 49 mounted thereon which is engaged by a pinion 50 driven by an engine or motor 51, the said engine 51 being shown as having a steam supply pipe 52 which is in communication with the boiler 35. A branch pipe 53 is also in communication with the boiler through the pipe 54 and is provided for the purpose of supplying steam to the vacuum pump. The vacuum pump and the engine 51 have exhaust pipes 56 and 57 respectively, which are in communication with the pipe 58 leading to a super-heater 59, the said super-heater being supplied with steam from the boiler 35 by the pipe 60. The steam receiver and the super-heater are in communication through the medium of a pipe 61, so that the exhaust from the vacuum pump and engine is conducted to the super-heater and from thence it is delivered to the steam receiver in a highly heated state, in order that it may supply heat for the drier through the communications previously described. The drier is provided with an exhaust pipe 62 which leads to a trap 63. It is stated, in this connection, that the super-heater or steam receiver and the trap are of any appropriate type as is also the engine or motor 51 and the vacuum pump 24; therefore, these elements or parts of the apparatus will not be described in detail.

The drier 33 has man-holes or discharge openings 64, one being located, preferably, near each end thereof in order that material may be discharged from the drier after it has been fully treated therein by opening the man-holes and rotating the drier.

A detailed operation of the parts of the apparatus has been included in the description of said parts but for the purpose of disclosing the method of carrying out the process and the operation of the apparatus, it is stated that in the operation, materials, such as have been specified or any material suitable for treatment, may be delivered to the tanks through the feed pipes and that the heavy solid matters will immediately gravitate toward the bottoms of the tanks and that those matters held in suspension while liquid is flowing through the filter, will be arrested by the filtering agent so that the liquid escaping from the tank will be purified. The feed pipes of the tanks are allowed to remain open until such time as the tanks become loaded, as it were, with solid or semi-solid matter which is in condition to be treated by the drier. At such a time, the valve and the particular tank or tanks that has become loaded or filled sufficiently to justify treatment, are closed and the liquid that has been filtered is drawn from the tank or tanks through the operation of the pump, said liquids being then forced into another tank or tanks which is in operation of being loaded. The solid or semi-solid matter contained in the tank or tanks is then drawn by the vacuum or partial vacuum, heretofore described, contained in the drier, from the said tanks to the drier, it being understood that the drier has been heated through the agencies heretofore described. Communication between the drier and the tanks is then interrupted and the said drier is rotated so that the solid or semi-solid matter therein may be agitated and subjected to the heat. Such treatment results in removing moisture from the material treated and said moisture is drawn off by the vacuum pump and is discharged in any suitable way as waste. When the drying process has been carried to the state of completion, the man-holes are opened and the material which is in the powdered form escapes from the openings during the rotation of the said driers.

I claim—

1. In an apparatus for reducing sewage and the like, settling tanks, a drier, means for creating a partial vacuum in the drier and exhausting vapor therefrom, means of communication between the drier and the settling tanks near the bottoms thereof whereby the partial vacuum in the drier will serve to draw material from the settling tanks, means of communication between the tanks and the means for creating a partial vacuum in the drier whereby the liquid in the settling tanks may be drawn therefrom, and means of communication between the means for creating the vacuum and the said tanks whereby the liquid drawn from one tank may be returned to another tank.

2. In an apparatus for reducing sewage and the like, settling tanks, a drier, a vacuum pump for creating a partial vacuum in the drier and exhausting vapor, means of communication between the pump and the drier, means of communication between the drier and the tanks near the bottoms thereof, means connecting the vacuum pump with the tanks intermediate the height thereof, whereby liquid may be drawn from the said tanks, a second means of communication between the said pump and the tanks, and means for controlling the said means of communication whereby liquids drawn from one tank may be discharged through the pump into another tank.

3. In an apparatus for reducing sewage and the like, means for separating the solids and semi-solids from the liquids of night soil and sewage, said means comprising settling tanks, a drier, means of communication between the tanks near their bottoms and the said drier, whereby the material settling in the tanks may be drawn into the drier, a pump for creating a partial vacuum in the drier for effecting the transfer of material from the tanks to the drier, means of communication between the tanks intermediate their heights and the pump whereby liquids may be drawn from the tanks, a second means of communication between the pump and the said tanks whereby material drawn from one tank may be returned to another tank, means for controlling the means of communication, and means for exhausting vapor from the drier, and for conducting vapor therefrom.

4. In an apparatus for reducing sewage and the like, means for separating the solids and semi-solids from the liquids of night soil and sewage, said means comprising settling tanks, a drier, means of communication between the tanks near their bottoms and the said drier, whereby the material settling in the tanks may be drawn into the drier, a pump for creating a partial vacuum in the drier for effecting the transfer of material from the tanks to the drier, means of communication between the tanks intermediate their heights and the pump whereby liquids may be drawn from the tanks, a second means of communication between the pump and the said tanks, whereby material drawn from one tank may be returned to another tank, means for controlling the means of communication, and means for exhausting the vapor from the drier and for conducting vapor therefrom, and means for heating the drier.

In testimony whereof, I hereunto affix my signature in the presence of two witnesses.

ANGUS MACLACHLAN.

Witnesses:
R. B. HAMMOND,
W. BARTON HAMMOND.